United States Patent [19]

Fukushige et al.

[11] Patent Number: 5,242,486
[45] Date of Patent: Sep. 7, 1993

[54] COOLANT FOR ALUMINUM DROSS

[75] Inventors: Shinobu Fukushige, Kanuma; Masayoshi Sakashita, Utsunomiya; Tadashi Mantani, Nagareyama, all of Japan

[73] Assignee: Epoleon Corporation, Japan

[21] Appl. No.: 856,163

[22] PCT Filed: Oct. 24, 1989

[86] PCT No.: PCT/JP89/01090

§ 371 Date: Apr. 1, 1992

§ 102(e) Date: Apr. 1, 1992

[51] Int. Cl.$^5$ .............................. C22B 7/00
[52] U.S. Cl. ........................... 75/672; 164/123
[58] Field of Search ..................... 75/672; 164/123

[56] References Cited

U.S. PATENT DOCUMENTS 2,698,469  1/1955  Mueller ..................... 164/123
3,751,243  8/1973  McLeod ..................... 75/672

FOREIGN PATENT DOCUMENTS 49-28321  7/1974  Japan .
52-37961  9/1977  Japan .

Primary Examiner—Peter D. Rosenberg
Attorney, Agent, or Firm—Larson and Taylor

[57] ABSTRACT

The invention relates to a coolant of aluminium dross, which used in separating and recovering metallic aluminium involved in the dross which is formed when aluminium and aluminium alloys are molten. The coolant consists of 4–60% by weight of a carbonaceous material wherein the particles whose size is 2–7 mm in diameter are not less than 50% by weight, and 4–60% by weight of at least one of obsidian, perlite, vermiculite and natural pumice whose particle size is 2–7 mm in diameter. Alternately, the coolant consists of 20–50% by weight of the carbonaceous material wherein the particles whose size 2–7 mm in diameter are not less than 50% by weight, 20–50% by weight of at least of obsidian, perlite, vermiculite and natural pumice whose particle size is 2–7 mm in diameter, and not more than 30% by weight of at least one of SiC or metal oxides such as of Al, Si, Zr, Cr and Zn. Preferably, said carbonaceous material is at least one of coke and charcoal.

3 Claims, No Drawings

COOLANT FOR ALUMINUM DROSS

TECHNICAL FIELD OF THE INVENTION

This invention relates to a coolant of aluminium dross, which is useful for restraining the loss of metallic components, which is caused by oxidation of the melt owing to overheating of the dross, to improve the recovering rate of the metallic components, in the process of separating and recovering the metallic components involved in the dross which is formed when aluminium or aluminium alloys are molten.

BACKGROUND ART

When aluminium and aluminium alloys (hereinafter referred to as aluminium) are molten, dross is formed due to the oxidation of the melt and it floats up to the surface of the melt. Particularly, a great amount of dross is formed in melting the thin materials such as of can and the materials which contain in large quantity easily-oxidisable elements such as magnesium. As the demand to the similar materials increases these days, therefore, there is an increasing generation of dross when waste materials are molten.

Though the dross floated up th the surface of the melt is discharged to the outside of the melting furnace it contains a considerable amount of aluminium as metallic component. Since the amount of aluminium reaches, for example, as much as about 70% by weight, the so-called "dross recovery" is carried out in order to recover the aluminium content.

The dross constriction is such a process that the dross still at a high temperature, which has been discharged to the outside of the furnace, is exothermally stirred in a stirring apparatus, and the aluminium in the solidified or semi-solidified state is re-molten and dripped to the bottom of said apparatus thereby to be stayed there and then separated and recovered. In such a case, it is effectively carried out to add an exothermic flux in order to promote the exothermic reaction of aluminium for the re-melting.

In the dross recovery, about 30% by weight of aluminium in the dross is recovered, but usually about 40% by weight of aluminium still remains as it is dispersed in the dross. The residual aluminium repeats oxidation and heat generation when the dross is left as it is, and its metallic component is lost, and therefore the residual aluminium must be cooled quickly.

The cooling methods therefor conventionally carried out are a method of scattering the dross on the floor, a method of sprinkling water thereon, and a method of charging a cold dross thereinto.

Said cooling methods have respectively the following problems to be solved. That is, the method of scattering the dross on the floor requires a large area, so that it brings about environmental pollution due to the generation of dust. The method of sprinkling water also brings about environmental pollution due to the generation of dust and occasionally it involves danger such that the quick evaporation of water becomes explosive. On the other hand, the method of charging a cold dross has a disadvantage in that it must be charged in a considerably great amount, and it is known that this method does not render a sufficient cooling effect.

DISCLOSURE OF THE INVENTION

The inventors of this invention have made their extensive research and experiments in an attempt to solve the various problems involved in said known methods. As a result, they have been successful in developing a coolant for aluminium dross according to the invention. The technical constitution of the invention resides in a coolant for aluminium dross characterised in that said coolant consists of 40-60% by weight of a carbonaceous material wherein the particles whose size is in the range 2-7 mm in diameter are not less than 50% by weight, and 40-60% by weight of at least one of obsidian, perlite, vermiculite and natural pumice whose particle size is in the range 2-7 mm in diameter, and a coolant for aluminium dross characterised in that said coolant consists of 20-50% by weight of the carbonaceous material wherein the particles whose size is in the range 2-7 mm in diameter are not less than 50% by weight, 20-50% by weight of at least one of obsidian, perlite, vermiculite and natural pumice whose particle size is in the range 2-7 mm, and not more than 30% by weight of at least one of SiC or metal oxides such as of Al, Si, Zr, Cr and Zn. Preferably, said carbonaceous material is at least one of coke and charcoal.

THE BEST MODE TO CARRY OUT THE INVENTION

In the first invention, a carbonaceous material changes an oxidative atmosphere to a reducing atmosphere when it acts with dross in high temperature, so that it refrains aluminium from oxidation whereby the greatness of heat conduction results in cooling the dross rapidly. The reason of setting the amount of the carbonaceous material to 40-60% by weight is that if not more than 40% the cooling capacity is insufficient and if more than 60% the other effective components are reduced in amount thereby not to be preferable. Referring to the particle size, if the particles whose diameter is 2-7 mm are not more than 50% by weight the particles of not more than 2 mm diameter ignite early thereby to be burned out, whereas if the particles exceed 7 mm in diameter their reaction is too slow, so that both the cases are not preferable to achieve the initial object.

Then, obsidian, perlite, vermiculite or natural pumice vigorously expands under a temperature over 700° C. and is to absorb a great amount of heat from the dross at high temperature. Referring to the particle size of these materials, the recovering rate of aluminium will be lowered in the range outside the above.

Even in the second invention the same thing can be said. The carbonaceous material changes the oxidizing atmosphere to the reducing atmosphere when it acts with dross, so that the oxidation of aluminium is restrained and the greatness of heat conduction results in cooling the dross rapidly. The reason of setting the amount of the carbonaceous material to 20-50% by weight is that if not more than 20% the cooling capacity is insufficient, whereas if exceeds 50% the other effective components are reduced in amount thereby not to be preferable. Referring to their particle size, if the particles whose diameter is 2-7 mm are not more than 50% by weight the particles having a diameter not greater than 2 mm ignite early to be burned out, and if the particles exceeds 7 mm in diameter they react too slowly, so that both the cases are not preferable to achieve the initial object.

Then, obsidian, perlite, vermiculite or natural pumice vigorously expands under a temperature over 700° C. and is to absorb a great amount of heat from the dross at high temperature. The reason of setting their particle size to the above range is that in the outside of said range the recovery rate of aluminium is lowered.

SiC or metal oxides such as of Al, Si, Zr, Cr and Zn perform their auxiliary duties of coolant as inorganic materials having great thermal capacity, and they also act to dry the dross to allow aluminium to be easily separated and collected. It will be all right to suitably select their mount within the range not more than 30% by weight.

In the ordinary using method of the coolant according to the invention, the coolant is charged into the dross after dross recovery within a dross recovering apparatus and then it is stirred. However, for the cooling of the dross the coolant can naturally, sufficiently be used even within other apparatuses such as rotary cooler.

In case the aluminium dross to be treated is lowered below the desired temperature when using the coolant of the invention, it will suffice to use a conventionally used exothermic flux before adding the coolant. On the other hand, the offensive odor emitted owing to the use of said exothermic flux is adsorbed by the adsorbtive ability of the present composition, and therefore, the coolant of the present invention has even a deodorising effect.

Referring to the amount of using the coolant, it is not less than 5% by weight to the dross, and it may be suitably increased depending on the temperature of the dross and the condition of heat generation.

EXAMPLES

A ASTM6061 aluminium alloy was molten in a 10 ton reverberatory furnace and 300 kg dross was sampled from the formed dross. After the dross recovery of the sampled dross by a dross recovering machine a 30 kg coolant of the present invention was charged into said dross in the machine, the mixture of the dross and the coolant was stirred for 10 minutes, and the temperature of the dross and the metallic aluminium component remaining in the dross were measured. The result of the measurement is shown below together with comparative examples of using cold dross.

EXAMPLE 1

The coolant of the invention was blended in such a proportion that coke where the particles whose size is in the range 2-7 mm in diameter are 60% by weight is 50% by weight, and obsidian of the same particle size is 50% by weight.

|  | Example 1 | Comparative example 1 |
| --- | --- | --- |
| Amount (kg) of dross | 300 | 300 |
| Amount (kg) of recovered metallic aluminium | 95 | 94 |
| Additive amount (kg) of the coolant of the invention | 35 | 110 |
| Temperature (°C.) of the dross (immediately after dross recovery) | 1090 | 1090 |
| Temperature (°C.) of the dross (10 minutes after the charging of the coolant) | 435 | 610 |
| Residual metallic aluminium component (% by weight) | 44 | 30 |

EXAMPLE 2

The coolant of the invention was blended in such a proportion that coke where the particles whose size is in the range 2-7 mm in diameter are 80% by weight is 40% by weight, perlite of the same particle size is 50% by weight, No. 3 siliceous sand is 5% by weight, and zinc white is 5% by weight.

|  | Example 2 | Comparative example 2 |
| --- | --- | --- |
| Amount (kg) of dross | 300 | 300 |
| Amount (kg) of recovered metallic aluminium | 94 | 94 |
| Additive amount (kg) of the coolant of the invention | 30 | 110 |
| Temperature (°C.) of the dross (immediately after dross recovery) | 1020 | 1020 |
| Temperature (°C.) of the dross 10 minutes after the charging of the coolant | 420 | 580 |
| Residual metallic aluminium component (% by weight) | 44 | 30 |

It will be understood from each of Examples 1 and 2 that compared with the comparative examples of using cold dross, the use of the coolant according to the invention exhibits temperature fall of the dross and a prominent effect of restraining the loss of metallic aluminium due to oxidation, which effect is produced being caused by the temperature fall.

We claim:

1. A coolant for aluminium dross, which consists of 40-60% by weight of a carbonaceous material wherein the particles whose size is in the range 2-7 mm in diameter are not less than 50% by weight, and 40-60% by weight of at least one of obsidian, perlite, vermiculite and natural pumice whose particle size is in the range 2-7 mm in diameter.

2. The coolant for aluminium dross, which consists of 20-50% by weight of the carbonaceous material wherein the particles whose size is in the range 2-7 mm in diameter are not less than 50% by weight, 20-50% by weight of at least one of obsidian, perlite, vermiculite and natural pumice whose particle size is in the range 2-7 mm in diameter, and not more than 30% by weight of at least one of Sic or metal oxides such as of Al, Si, Zr, Cr and Zn.

3. The coolant for aluminium dross according to claim 1 wherein said carbonaceous material is at least one of coke and charcoal.

* * * * *